United States Patent [19]

Stoner

[11] Patent Number: 5,182,585
[45] Date of Patent: Jan. 26, 1993

[54] EYEGLASSES WITH CONTROLLABLE REFRACTING POWER

[75] Inventor: Robert B. Stoner, Tucson, Ariz.

[73] Assignee: The Arizona Carbon Foil Company, Inc., Tucson, Ariz.

[21] Appl. No.: 765,886

[22] Filed: Sep. 26, 1991

[51] Int. Cl.⁵ .................................. G02C 1/00
[52] U.S. Cl. ......................... 351/41; 351/158
[58] Field of Search .............. 351/41, 158, 159, 210, 351/168; 359/666

[56] References Cited

U.S. PATENT DOCUMENTS

| | | |
|---|---|---|
| 2,437,642 | 3/1948 | Henroteau . |
| 2,576,581 | 11/1951 | Edwards . |
| 3,161,718 | 12/1964 | De Luca . |
| 3,614,215 | 10/1971 | Mackta ................................. 351/41 |
| 3,738,734 | 6/1973 | Tait . |
| 4,174,156 | 11/1979 | Glorieux ............................. 351/168 |
| 4,181,408 | 1/1980 | Senders ............................. 351/159 |
| 4,418,990 | 12/1983 | Gerber ............................... 351/158 |
| 4,466,706 | 8/1984 | Lamothe . |

Primary Examiner—Rodney B. Bovernick
Attorney, Agent, or Firm—Antonio R. Durando; Harry M. Weiss

[57] ABSTRACT

Eyeglasses equipped with liquid lenses having adjustable refractive power that depends on the amount of liquid forced into each lens. An electrically powered pump and an electronic controller regulate the liquid input to the lenses in response to a signal determined by the focal length required for viewing a given object in the field of vision. This focal length is determined by the use of a rangefinder mounted on the frame of the eyeglasses. The system is programmed for automatic response tailored to the specific eyesight of the wearer.

16 Claims, 3 Drawing Sheets

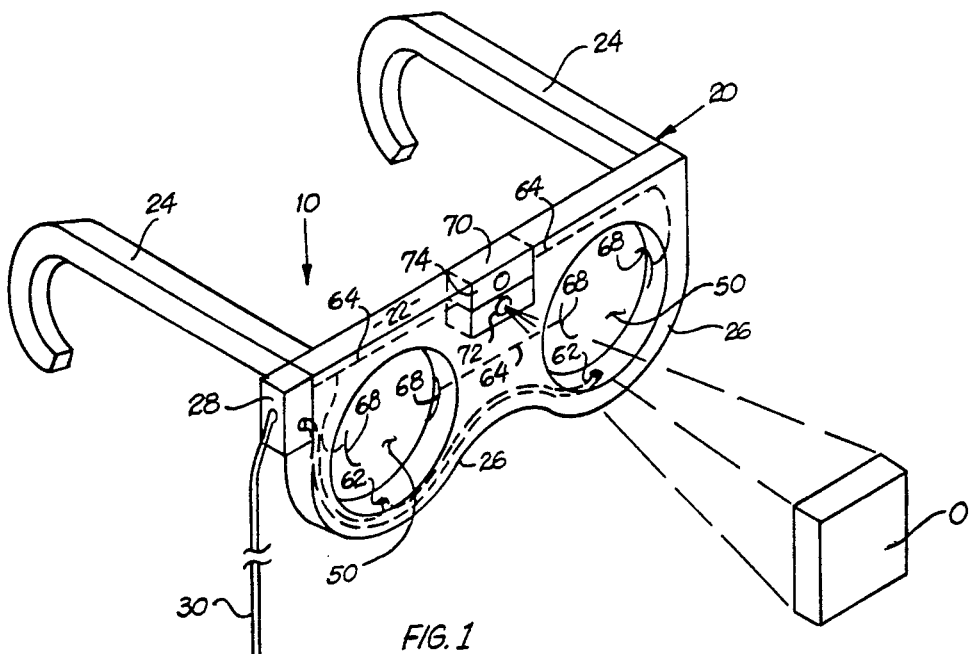
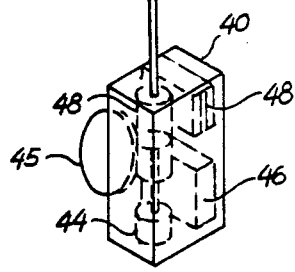
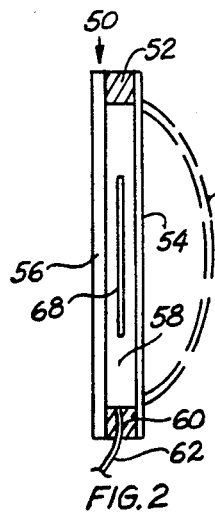
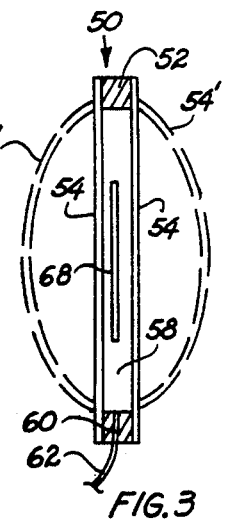
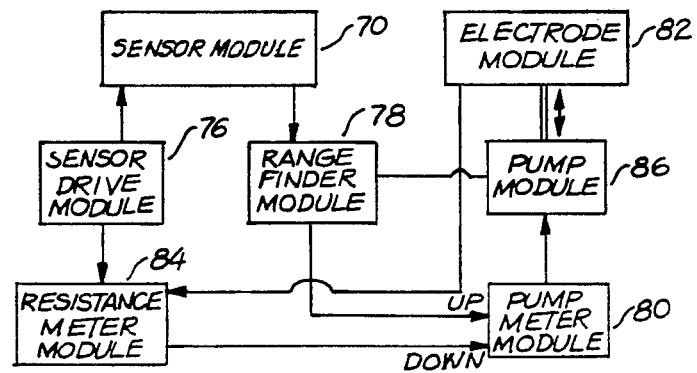

EYEGLASSES WITH CONTROLLABLE REFRACTING POWER

BACKGROUND OF THE INVENTION

1. Field of the Invention

This invention is related to the general field of lenses and spectacles with variable focal length. In particular, the invention provides a new method and apparatus for adaptively controlling the focal length of liquid lenses in eyeglasses by varying the curvature of each lens as a function of the desired focal distance.

2. Description of the Prior Art

A healthy young person is typically able to focus his or her eyesight from about 25 centimeters to infinity. As a result of presbyopia, which is very common with age, as well as because of disease, genetic conditions or accidents, the ability to focus one's eyes over a wide range of viewing distances often becomes greatly diminished with time. Therefore, at some point in their lives most people need to wear eyeglasses to correct their vision.

In aid to their ability to adjust their vision for different distances, people resort to the use of bifocal or even trifocal lenses, whereby optimum correction is provided for predetermined distances. Unfortunately, these lenses do not provide good correction for intermediate distances, for which people continue to have adjustment problems. Therefore, the ideal corrective lens should have adjustable refractive power to provide variable vision compensation for any distance. This invention is directed at producing this result.

Night-vision glasses, binoculars, cameras and similar devices that contain a chain of lenses may have adjustable focal length (similar to a zoom lens), often including automatic focusing, but they have only a restricted field of view. They are also heavy and cumbersome because of the multiple lenses and mechanisms required for the variable focal length feature. As a result, these mechanisms are not yet found in standard eyewear, but several patents exist covering methods and devices to achieve this goal through the use of liquid lenses. See, for example, U.S. Pat. No. 2,437,642 to Henroteau (1948), U.S. Pat. No. 2,576,581 to Edwards (1951), U.S. Pat. No. 3,161,718 to De Luca (1964), U.S. Pat. No. 3,614,215 to Mackta (1971), U.S. Pat. No. 3,738,734 to Tait et al. (1973), U.S. Pat. No. 4,174,156 to Glorieux (1979), and U.S. Pat. No. 4,466,706 to Lamothe (1984). All of these patents disclose inventions designed to produce varied focal lengths by changing the content, shape or thickness of fluid-filled lenses, thus providing variable refractive characteristics in a single lens.

In particular, U.S. Pat. No. 4,181,408 to Senders (1980) discloses a vision compensation system that includes fluid lenses that are adaptively adjustable to correct for vision at different focal lengths. The refractive power of the lenses, mounted on a standard spectacle frame, is changed by varying their curvature as a function of the amount of liquid retained in them, which is in turn controlled by a hydraulic pump system that is operable either manually or automatically. The apparatus also includes a system of sensors for detecting the relative position of a wearer's eyes in response to the focal point of vision and for recording the corresponding refraction characteristics of the lenses. In a manual mode of operation, the optimal fluid charge and hydraulic setting of each lens are correlated with a corresponding focal distance, as determined by the wearer. By recording this information for various distances in an electronic control circuit, the system is calibrated to provide automatic response in an servo mode of operation. Thus, for a given focal distance measured by the relative position of the wearer's eyes, the system automatically produces a hydraulic setting according to the prerecorded calibration. Rangefinder apparatus for directly measuring the distance between the lenses and an object being viewed is not incorporated in the invention.

Although the Senders invention is theoretically satisfactory, it requires a complicated control system for its implementation. As described in the patent, it includes a source of infrared radiation directed at each eye and sensor arrays to receive the reflected radiation to detect the position of the junction between the sclera and the iris. Thus, by measuring the relative position of each eye, and therefore their convergence to a common point of sight, the distance of the focal point of vision can in principle be determined. In addition, the system requires special sensors to measure the quantity of liquid in the lenses, so that a correlation can be established with the eye position.

Obviously, this complex hardware is very sensitive to any change, such as in temperature, that may cause misalignment of the various components and require a new calibration. Moreover, it appears that the method used to determine the focal point of vision is restricted to the field of view directly in front of the wearer because the movement of the eyes to peripheral areas changes the relationship between the angle of reflection of the infrared beams and the vergence angle of the eyes, thus invalidating or disabling the automatic focusing capability of the apparatus.

It is apparent that the technology of providing adjustable lenses for continuous optimal compensation at all focal lengths is in its infancy and that great progress is expected to occur in the future. The present invention is directed at simplifying the methods used in the prior art for producing a control signal to the hydraulic system driving the liquid lenses and at overcoming the above described deficiencies.

BRIEF SUMMARY OF THE INVENTION

One objective of this invention is the development of liquid-lens eyeglasses capable of continuous adjustment for varying focal distances.

Another objective of the invention is a system that determines the desired focal adjustment by sensing the presence of a primary object at a certain distance in the field of vision of a user by means of a rangefinder and that automatically adjusts the lenses to a corresponding predetermined setting that causes them to be on focus at that distance for the viewer.

A further goal of the invention is an apparatus that can incorporate some fixed optical corrections with its variable focus characteristics in order to provide complete eyesight compensation.

Yet another goal of the invention is an apparatus that can be implemented with independent control and correction for each lens to account for differences in the unassisted refractive power of the eyes of the user.

A further objective of the invention is an apparatus that can incorporate shades or dark lenses for use in bright sunlight.

Still another objective of the invention is an apparatus that can also be used as an adjustable magnifying lens.

A final objective is the easy and economical manufacture of the eyeglasses according to the above stated criteria by using commercially available techniques and materials.

According to these and other objectives, the present invention consists of eyeglasses equipped with liquid lenses having adjustable refractive power that depends on the amount of liquid forced into each lens. An electrically powered pump and an electronic controller regulate the liquid input to the lenses in response to a signal determined by the focal length required for viewing a given object in the field of vision. The distance to the object is measured by a rangefinder mounted on the frame of the eyeglasses. The system is programmed for automatic response tailored to the specific eyesight of the wearer.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 is a perspective view of an eyeglass assembly embodying the variable focal length system of this invention and of an object in the field of vision of the apparatus.

FIG. 2 is a cross-sectional view of one type of liquid lens used in the apparatus of FIG. 1.

FIG. 3 is a cross-sectional view of another type of liquid lens used in the apparatus of FIG. 1.

FIG. 4 is a block diagram of the variable focal-length control system of the invention, illustrating the functional relationship of the various physical components comprising the apparatus.

DETAILED DESCRIPTION OF THE INVENTION

Figure 5:
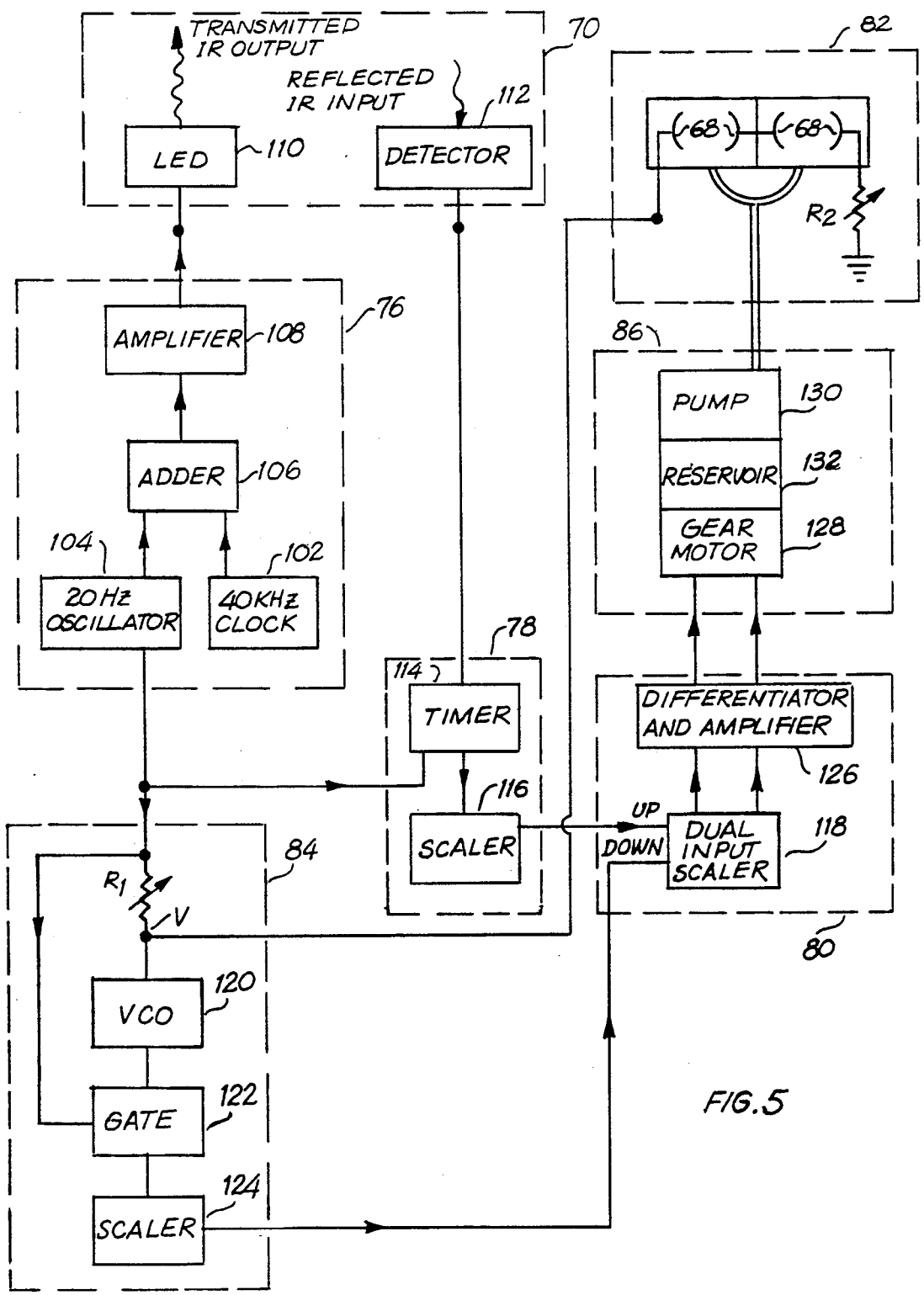
FIG. 5 is block diagram of circuitry used in an embodiment of the invention incorporating an automatic infrared rangefinder.

The production of a sharp image on the retina of the eye, which corresponds to a view that is in focus to the observer, requires that the successive refraction of rays of light from a point on the object being observed through the various surfaces in the path of travel of the light result in their convergence to a single point on the retina. People with normal eyesight can naturally adjust the refractive power of their eyes to cause such convergence in most instances. On the other hand, the refractive effect of each lens in prescription eyeglasses is designed to compensate for the refraction capability that is missing in the eyes of people with abnormal eyesight, either because of age or other vision defect.

This invention consists of a new type of vision compensation apparatus, wherein the needed supplementary refractive power is provided by continuously-adjustable liquid lenses. Referring to the drawings, wherein like parts are identified with like symbols and numerals throughout this specification, FIG. 1 represents a perspective view of an eyeglass assembly 10 embodying the variable focal length system of the invention. The assembly comprises a spectacle unit 20 and a control unit 40 joined by a umbilical cord 30 (shown in truncated view) containing hydraulic and electrical connections between units 20 and 40. The spectacle unit 20 consists of a frame 22 shaped and built like the type normally used for standard eyeglasses and including two temple pieces 24 (or other form of support structure) for normal wear by a user. The frame provides a round support rim 26 for each of two liquid lenses 50 encased therewithin. Obviously, the invention could be practiced in equivalent fashion with one liquid lens only. As shown in cross-section in FIG. 2, one embodiment of a liquid lens consists of a circular spacer ring 52 sandwiched between a transparent elastic membrane 54 and a transparent rigid disk 56 to form a reservoir 58 for holding a transparent fluid. A small channel 60, consisting of a perforation in the spacer ring 52 (or, equivalently, a perforation in the rigid disk 56), permits the hydraulic connection of the reservoir 5 with the exterior of the lens through fluid-filled tubing 62. As shown in the embodiments of the eyeglasses illustrated in the figures, the tubing 62 may be incorporated in the frame 22 of the spectacles as a channel in the interior of the frame connecting each lens to the control unit 40 through the umbilical cord 30. Of course, each lens must be encased in the frame 22 of the spectacles in such a way as to ensure a leak-proof hydraulic connection between the channel 62 in the frame and the spacer ring of the lens to avoid leakage of the fluid from the system.

The distinctive feature of liquid lenses is their variable focal length as a function of the amount of fluid in them. The elastic membrane 54 is stretched by the liquid pushing against it from inside the lens and it assumes an approximately spherical shape (shown as 54', for example) that imparts lens characteristics to the assembly. Of course, the degree of deformation of the membrane and the corresponding specific refractive power depends on the amount of liquid in the lens, which, for the purposes of this invention, is determined by the control unit 40. As shown in this embodiment, this unit consists of a portable package containing the hydraulic and electronic systems used to adjust the focal length of the lenses 50 in the spectacles. The individual components contained in the control unit are not shown in detail in FIG. 1 because they constitute known components that one skilled in the art could easily assemble in a variety of ways to produce the desired result, but their functional relationship is shown in block diagram form in FIG. 4. In essence, referring to FIG. 1, the unit comprises a reservoir 42 for the lens fluid, a pump 44 for exchanging fluid between the reservoir and the lenses, a power source 46 for the pump, and a microprocessor (control circuitry) 48 to operate the pump. The umbilical cord 30 connecting the control unit 40 with the spectacles 20 (through a connection box 28) serves as a sheath for the hydraulic line 62 between the pump and the lenses 50 and for the electric wiring 64 required to provide automatic control for the unit, as explained in detail below. Note that the reference number 64 in the figures may refer to single or multiple wires, as needed for the functioning of the apparatus according to principles obvious to those skilled in the art.

Thus, the adjustment of the refractive power of the lenses 50 is provided by changing the amount of fluid (which in the preferred embodiment of the invention is a liquid) contained in each lens. It is to be noted that lenses with two elastic membranes (illustrated in FIG. 3) could also be used to practice the invention, but the best results have been obtained with a single membrane. In order to provide protection to the eyes of a wearer, the lens is positioned with the stretchable membrane facing forward and the rigid disk facing the eye, so that eye contact with the liquid would be minimized in case of accidental rupture of the membrane. Since the rigid disk can be manufactured with any transparent material, such as glass or plastic, it can be made very strong and durable. Moreover, so long as no curvature is introduced on the surface of the disk, its thickness has no optical effect on the performance of the lens, allowing for very sturdy construction. Of course, it may become desirable to use the liquid lens in reverse position (i.e., with the flexible membrane facing the eye of the wearer).

Figure 7:
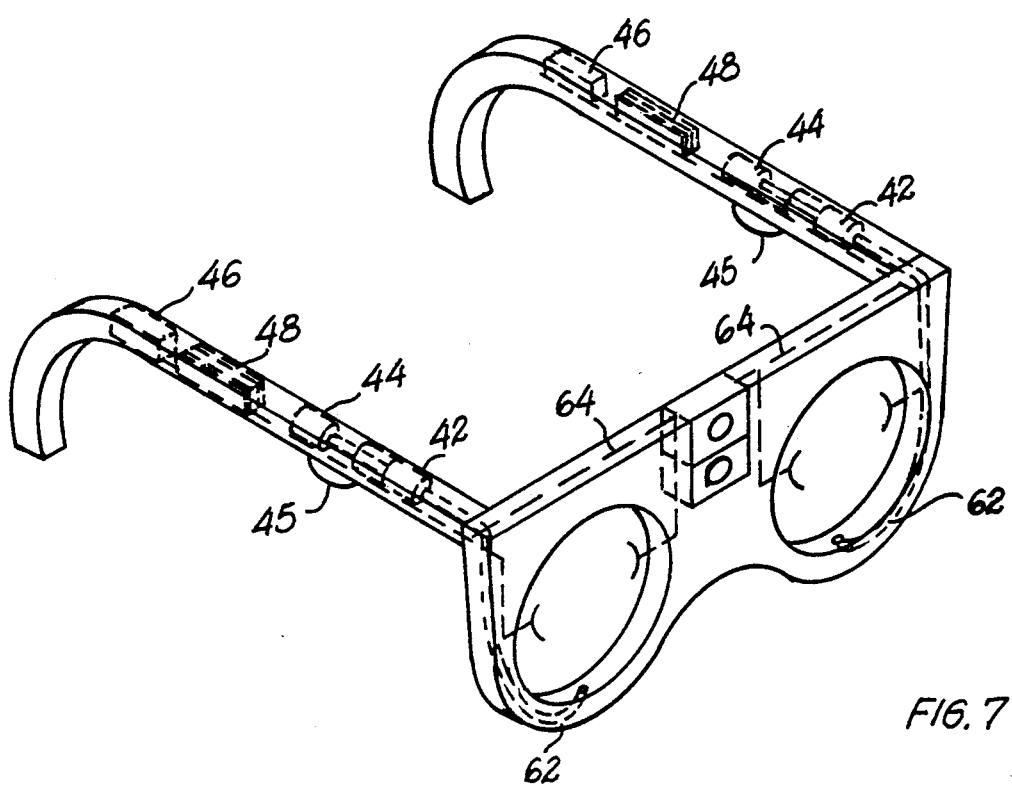
FIG. 7 is a perspective view of yet another embodiment of the invention illustrating two independent control systems, one for each lens, incorporated into the corresponding temple piece of the spectacles.

The one-membrane construction of the lens 50 is also suitable for correction of astigmatism, prismatic abnormality and other visual defects by shaping the rigid disk to the required corrective prescription. This can also be accomplished independently for each eye according to methods and procedures normally followed in the art of grinding eyeglass lenses. Only the power correction (i.e., the focal length adjustment) is accomplished by varying the amount of fluid in the lens. Note that the power of the lens may be adjusted to be negative, corresponding to a concave membrane surface, by extracting (instead of injecting) fluid. Similarly, for people requiring different power correction for each eye, it is possible to have separate hydraulic lines connecting each lens to a separate pump system that would function independently according to the principles herein disclosed. This embodiment is not shown in detail in the figures for simplicity of illustration, but it would be an obvious extension of the illustration of FIG. 1, with a separate control system for each lens. FIG. 7, discussed below, illustrates an embodiment with independently controlled lenses. Finally, shades or absorbing membranes could be added to the rigid disk or to the elastic membrane of each lens to provide dark glasses or as a protective outer shield for each lens, either as a removable feature or incorporated permanently into the lenses.

It has been found that polyester membranes are capable of stretching with a high degree of resilience (6,000 cycles produced no leakage or rupture) to an approximately spherical shape, forming a well-defined pair of lenses with virtually the same focal length. Using the configuration illustrated in FIG. 2, wherein a circular polyester membrane and a poly-allyl diglycol carbonate disk (the plastic normally used for eyewear lenses, marketed by PPG Industries, Inc. of Pittsburgh, Pa., under the trade name "CR-39") were cemented to a stainless steel spacer ring two inches in diameter to define a lens reservoir of approximately 3 ml in its unstretched position, the resulting lenses produced up to four diopters of optical power with adequate optical quality. For example, the addition of 4 ml of liquid produced a lens with approximately 3 diopters of magnification, which enabled a presbyopic user to read easily through them at a distance of 25 cm, as expected from known prescription requirements.

The transparent refractive liquid used in the preferred embodiment of the invention consists of a solution of 100 grams of sucrose in 100 ml of water, with the addition of two grams of sodium chloride to increase the electrical conductivity of the solution. This liquid composition was chosen for its relatively high refractive index in combination with its low viscosity. In fact, it was found that many other common sugars (such as fructose, glucose, maltose, and lactose), and any mixture thereof, in similar proportions are also suitable liquids to practice the invention. Of course, an electrolyte (such as sodium chloride, or any other salt that can be easily dissolved and ionized in water) must be added to the sugar solution in order to provide the conductivity required for the lens control system. Other liquid compositions have been found to be also suitable, such as a solution of 100 grams of potassium iodide in 100 ml of water, with one gram of sodium hydroxide to prevent oxidation. Thus, in general, any non-corrosive transparent fluid may be used to practice the invention, provided that it has sufficiently low viscosity for rapid fluid flow into and out of the lenses. Ideally, in order to avoid stray reflections from the interfaces between the fluid and both the disk and the membrane, the refractive indices of the three materials should be the same. Therefore, the relative values of the refractive indices of these constituents are of great practical importance. Finally, inasmuch as the spectacles are constantly subject to human manipulation, the fluid used cannot be toxic, corrosive, or otherwise dangerous.

In order to control the amount of liquid in the lenses 50 (and therefore their refractive power) in response to varying focusing requirements, a rangefinder sensor module 70 is mounted on the frame 22 (see FIG. 1) to determine the distance to an object O being observed. While any rangefinder would be suitable to practice the invention, it must be capable of providing a precise determination of the distance of an object in the field of view from the lenses, so that this distance can then converted to a corresponding adjustment in the amount of liquid in the lenses. The same principle is already used for automatic focusing of numerous optical devices, such as still cameras, video cameras and binoculars. The focal distance of these devices is changed by moving solid lens components relative to each other or to a mounting frame. However, the invention uses varying amounts of liquid in liquid-filled lenses to change the focal length of the apparatus, but the same rangefinder devices (based on infrared, laser, ultrasonic, or radio frequency technology) can be utilized for automatic control.

Accordingly, the preferred embodiment of the invention is described below in terms of an infrared range finder and related circuitry. As illustrated in FIGS. 1 and 4, the sensor module 70 comprises a transmitter 72, containing an infrared-emitting light-emitting-diode (LED), and an infrared-sensitive receiver 74. The module 70, which receives modulated power provided by a sensor driver module 76 in the control unit 40, emits infrared radiation in the direction of the field of vision of the spectacles and receives the portion of radiation reflected back by the object O. An electrical signal, generated by the receiver 74 in response to the intensity of the reflected radiation, is transmitted to the rangefinder module 78, where it is converted to a measure of the distance (range) from the eyeglasses to the object being viewed. In order to implement this conversion, timing signals are also sent from the driver module to the rangefinder module to synchronize the emission and reception of the infrared radiation. The range so calculated is encoded as a pulse rate used to increase the input drive on the pump-driver module 80.

In order to correlate the focal length of each lens 50 to a corresponding setting of the pump 44, a signal must be generated in relation to the amount of liquid in the lens. To that end, the liquid lenses of this invention incorporate a set of electrodes 68 (shown in FIGS. 1-3) to measure the electrical resistance across the span of the lens. Since electrical conductivity through an ionic solution increases with the cross-section of fluid available for electrical flow, the resistance across each set of electrodes decreases as more fluid is pumped into each lens. Therefore, this provides a measure of the corresponding degree of curvature of the lens. Accordingly, the electrical resistance provided by the fluid in each lens is used to determine the setting of the pump 44 and, correspondingly, the degree of curvature imparted on the lenses.

The pair of electrodes 68 in each lens is part of an electrode module 82, as illustrated in FIG. 4, connected to a resistance meter module 84 through the electrical wiring 64 in the frame of the spectacles and in the umbilical cord 30. In response to the electrical signal received from the electrode module, the resistance meter module develops a signal in the form of a pulse rate that depends on the resistance across the electrodes (and therefore on the shape and corresponding focal length of the lenses). This pulse rate is compared by the pump driver module 80 with that produced by the rangefinder module, discussed above, and the difference in pulse rate is converted to a electrical signal used to drive the pump module 86 (which comprises the pump 44 and the fluid reservoir 42). The pump module directs fluid into or out of the lenses, as needed, causing the resistance measured by the electrode module to vary to bring the pulse rates from the rangefinder and the resistance meter to equality. The pulse rate conversion factors that relate range to pulse rate (from the rangefinder module) and focal length to pulse rate (from the resistance meter module) are adjusted to minimize the focal length of the lenses (maximum curvature) for close-object viewing and to maximize it for distant viewing, with a sequence of intermediate focal settings corresponding to intermediate viewing distances. The minimum and maximum values are adjustable by the user for his or her particular visual needs.

Note that all of the electronic functions performed by the sensor driver module 76, rangefinder module 78, pump driver module 80, and resistance meter module 84 are part of the electronic circuitry referred to as microprocessor 48 in FIG. 1. A more detailed description of the operation of the invention is illustrated in the block diagram of FIG. 5, which is based on a specific implementation of the apparatus using off-the-shelf components. The sensor driver module 76 consists of a 40-kHz oscillator 102 (which serves as a clock) and a 20-Hz modulation oscillator 104. Signals from both of these at a level of approximately 1.5 volts peak to peak are added in an adder unit 106, and the resulting voltage is passed through an amplifier 108 and used to drive the LED 110 in the sensor module 70. Since the LED requires about 1.4 forward volts to operate, the LED's output consists of a 40-kHz signal modulated on and off once every 50 milliseconds (the period corresponding to the 20-Hz frequency). Thus, infrared radiation is emitted intermittently from the LED and, to the extent that it is reflected by an object within the field of emission, it is received by an infrared detector 112 in the receiver 74. This type of detector is a currently commercially available component that responds only to infrared signals modulated at 40 kHz (hence the use of a 40-kHz oscillator in the sensor driver module). The output of the detector 112 is +5 volts when no signal is present and 0 volts when an infrared signal is present above the detector's threshold. Thus, a characteristic output is generated for objects located at different distances from the sensor module 70, so that each specific output can be correlated to a specific distance. For the purposes of the invention, it is a simple matter to combine commercially available LED and detector components to make the system measure distances over a range of 25 to 200 cm. Measurements for distances greater than 200 cm are not required because correction for objects at infinity is normally adequate for good vision at those distances. The system provides some variability in the distance measured from the reflected signal because different objects have different reflectivities; however, the variations in the measured range, and hence the variations in the corresponding focal length at which the lenses would be set, are in most cases expected to be within the remaining accommodative power of the user's eyes.

The timer 114 in the rangefinder module 78 measures the time between the leading edge of a 20-Hz timing reference pulse and the next trailing edge of a detector-output pulse, in terms of 40-kHz pulses. Thus, for a close object the number of clock pulses in this interval is somewhat less than 10,000 while for an object at the farthest distance at which a reflected signal can be detected the number of pulses is 20,000. The 40-kHz pulses that are produced by the timer in the interval between the leading edge of a 20-Hz timing reference pulse and the next trailing edge of a detector-output pulse are scaled down by a first scaler 116 in the rangefinder module, and the output of the scaler is then sent to the "up" port of the dual-input scaler 118 in the pump driver module 80.

At the same time, the pulses that encode the focal length of the lenses are produced by the resistance meter module 84 in response to variations in the electrical resistance of the lenses. The 20-Hz waveform from the 20-Hz oscillator 102 in the sensor driver module is applied to a series of three resistances. Two of these are the adjustable resistors R1 and R2 in the resistance meter and the electrode modules, respectively. The third resistance is the series resistance of the fluid in the two lenses in the electrode module, as measured by the two sets of electrodes 68 within the lenses. The fluid is mixed from a combination of ionic and non-ionic solutes, as explained above, to have a resistance suitable for the application. As fluid is added to the lenses, the resistance of the lenses decreases and the amplitude of the 20-Hz input at node V connecting R1 to the electrode module and the voltage controlled oscillator (VCO) 120 in the resistance meter module also diminishes. As a result, the rate of production of pulses by the VCO decreases. These pulses are transmitted for a specific period of time during each 20-Hz cycle by the gate component 122 in the resistance meter module and are scaled down appropriately by a second scaler 124, which then transmits the scaled down pulse rate to the "down" port of the dual-input scaler 118 in the pump driver module. The conversion ratio between lens power (or focal length) and pulse rate is controlled by the settings on R1 and R2, the scaling ratio of the second scaler 124, and the time interval setting on the gate that transmits the pulses to the second scaler. This conversion ratio is set to make the focal length of the lenses correct at various values of the viewing distance by making the pulse rates from the second scaler 124 and the first scaler 116 equal for several specific focal lengths corresponding to specific ranges.

The pulses from the second scaler 124 in the resistance meter module and from the first scaler 116 in the rangefinder module, after conditioning as mentioned above so that equal rates imply setting the focal length to match an appropriate range, are fed into the dual-input scaler 118 in the pump driver module. The output of the dual-input scaler is a total count that remains constant on the average if the two inputs have equal rates and increases or decreases steadily if the two inputs have different rates. The output of the dual-input scaler is differentiated and amplified in a differentiator and amplifier unit 126 to produce a signal to drive the pump module 86. If the two inputs to the dual-input scaler have the same rate, the output is zero, meaning that the range as sensed by the rangefinder module corresponds to the correct focal distance of the lenses. If the inputs have different rates, the output of the differentiator and amplifier unit is an electric signal transmitted to the pump module to drive the gear motor 128 powering the pump 130 to move fluid in the appropriate direction from the reservoir 132 to correct the amount of fluid in the lenses, so that the desired balance is again attained.

While the preferred embodiment of the invention is described in connection with a pump driven by a gear motor, it is clear that any of a variety of other pumps would be suitable. These include, for example, motorized or hand-operated or compressed-gas operated pumps that drive the fluid with shaft-driven cylinder-and-piston combinations, peristaltic drives, solenoid-driven pistons, and diaphragm pumps. The critical feature is the ability to inject and extract precise amounts of liquid in response to control signals over a large number of operational cycles. In addition, a manual control can be added to the hydraulic system to permit the manual setting of the pump 44 and the corresponding adjustment of the fluid content in the lenses 50. Such a manual control is illustrated in FIG. 1 in the form of a wheel drive 45 directly effecting the position of the pump.

Note that equivalent embodiments of the same basic invention can be obtained with different kinds of rangefinders based on known technology, such as ultrasonic, laser, and radio frequency devices. Moreover, one skilled in the art could easily incorporate a memory in the microprocessor to set up a look-up table for direct control of the pump as a function of range. The average number of pulses in a ranging cycle obtained as function of distance of an object from the sensor module is easily measured experimentally and could be stored in such a table together with corresponding pump settings (corresponding to electrical resistances and focal lengths) to provide a reference for use in adjusting the pump setting in response to a given distance reading. The same infrared rangefinder circuitry could be easily adapted for this function.

Figure 6:
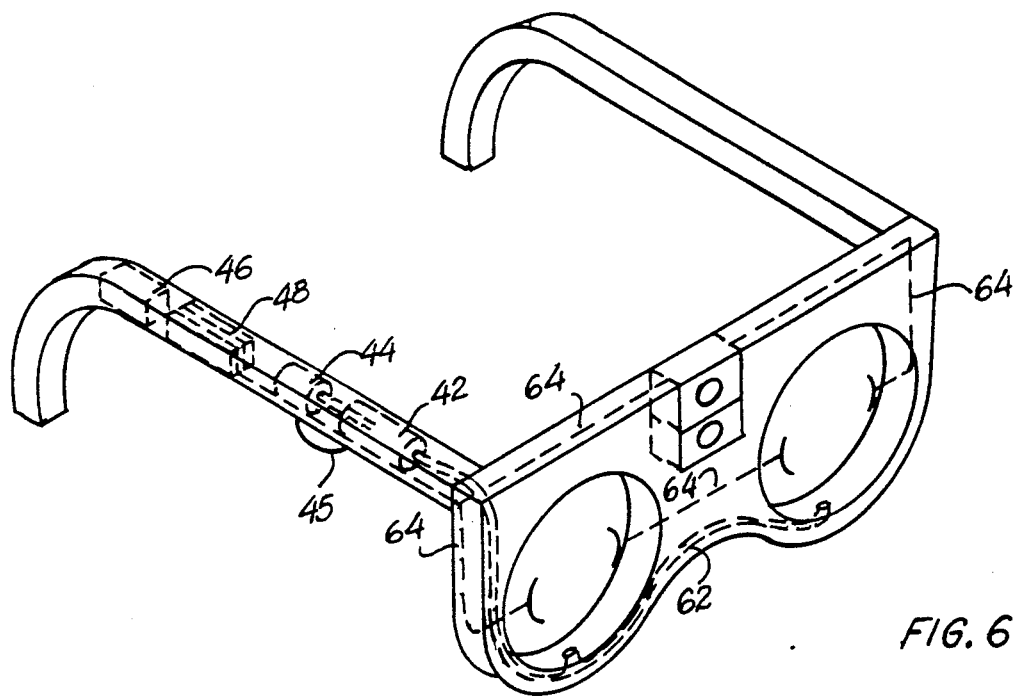
FIG. 6 is a perspective view of another embodiment of the invention illustrating the incorporation of the control system into one of the temple pieces of the spectacles.

Although the description of the invention is based for clarity on the two-unit eyeglasses assembly 10 shown in FIG. 1, it is apparent that miniaturization would make it possible to incorporate the control unit 40 within the spectacles 20, thus eliminating the need for a separate component and a connecting umbilical cord. One such embodiment is illustrated in FIG. 6 with the mechanical and electronic components built into one of the temple pieces 24. Finally, the method of the invention, as described, could be applied separately with separate control circuitry (microprocessors and pumps) to each lens in the glasses. A single sensor module would provide a distance reading to both microprocessors, which would separately generate a control for an adjustment to the setting of their respective pumps to vary the liquid content of their respective lenses. Such an embodiment is illustrated in FIG. 7.

Various other changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What I claim is:

1. Eyeglasses with controllable refractive power, comprising:
    (a) spectacles consisting of a frame and a supporting structure for normal wear by a user;
    (b) at least one liquid lens mounted on said frame and capable of variable refractive power as a function of the amount of liquid contained in it;
    (c) means for measuring the distance between said spectacles and an object being viewed by the user; and
    (d) means for adjusting the amount of liquid in said at least one liquid lens to cause it to correct the focus of the eye of the user to the measured distance;
    wherein said at least one liquid lens consists of a circular spacer ring sandwiched between a transparent stretchable membrane facing forward and a transparent rigid disk facing the eye of the user, and of a transparent fluid contained therein.

2. The eyeglasses described in claim 1, wherein said supporting structure consists of two temple pieces.

3. The eyeglasses described in claim 1, wherein said transparent fluid consists of a water solution containing approximately 50 percent by weight of a mixture of sugars containing at least one sugar selected from the group consisting of sucrose, fructose, glucose, maltose, and lactose, and containing approximately one percent by weight electrolyte.

4. The eyeglasses described in claim 3, wherein said means for adjusting the amount of liquid in said at least one liquid lens to cause it to correct the focus of the eye of the user to the measured distance consists of a pump, hydraulically connected to said at least one lens, and of a pair of electrodes, electrically connected to a resistance meter module, in each of said at least one lens; wherein said resistance meter module develops a signal in the form of a pulse rate in response to the electrical signal received from said electrodes, wherein this pulse rate is compared with the pulse rate produced by said rangefinder, and wherein the difference in pulse rates is converted to an electrical signal used to drive said pump to adjust the content of liquid in said at least one lens, as needed to bring the pulse rates from the rangefinder and the resistance meter to equality.

5. The eyeglasses described in claim 4, wherein said rigid disk further comprises optical corrective prescriptions for astigmatism, prismatic abnormality and other visual defects.

6. The eyeglasses described in claim 1, wherein said means for measuring the distance between said spectacles and an object being viewed by the user consists of a rangefinder.

7. The eyeglasses described in claim 6, wherein said rangefinder comprises a sensor unit consisting of a transmitter, containing an infrared-emitting light-emitting-diode, and an infrared-sensitive receiver; wherein said transmitter receives modulated power provided by a sensor driver module and emits infrared radiation in the direction of the field of vision of said spectacles, and said receiver receives the portion of radiation reflected back by said object; and wherein an electrical signal, generated by said receiver in response to the intensity of the reflected radiation, is converted to a pulse rate from the rangefinder encoded as a measure of the distance from the eyeglasses to the object being viewed.

8. The eyeglasses described in claim 6, wherein said rangefinder consists of an ultrasonic rangefinder.

9. The eyeglasses described in claim 6, wherein said rangefinder consists of a radio frequency rangefinder.

10. The eyeglasses described in claim 6, wherein said rangefinder consists of a laser rangefinder.

11. The eyeglasses described in claim 1, wherein said means for adjusting the amount of liquid in said at least one liquid lens to cause it to correct the focus of the eye of the user to the measured distance further comprise means for manually operating a pump hydraulically connected to said at least one lens.

12. The eyeglasses described in claim 1, wherein said rigid disk further comprises optical corrective prescriptions for astigmatism, prismatic abnormality and other visual defects.

13. A method for controlling the refractive power of eyeglasses, comprising the following steps:
 (a) providing spectacles consisting of a frame and a supporting structure for normal wear by a user;
 (b) providing at least one liquid lens mounted on said frame and capable of variable refractive power as a function of the amount of liquid contained in it, wherein said lens consists of a circular spacer ring sandwiched between a transparent stretchable membrane facing forward and a transparent rigid disk facing the eye of the user, and of a transparent fluid contained therein;
 (c) measuring the distance between said spectacles and an object being viewed by the user; and
 (d) providing means for adjusting the amount of liquid in said at least one liquid lens to cause it to correct the focus of the eye of the user to the measured distance.

14. The method described in claim 13, wherein said transparent fluid consists of a water solution containing approximately 50 percent by weight of a mixture of sugars containing at least one sugar selected from the group consisting of sucrose, fructose, glucose, maltose, and lactose, and containing approximately one percent by weight electrolyte.

15. The method described in claim 14, wherein said step of measuring the distance between said spectacles and an object being viewed by the user is accomplished by providing a rangefinder that comprises a sensor unit consisting of a transmitter, containing an infrared-emitting light-emitting-diode, and an infrared-sensitive receiver; wherein said transmitter receives modulated power provided by a sensor drive module and emits infrared radiation in the direction of the field of vision of said spectacles, and said receiver receives the portion of radiation reflected back by said object; and wherein an electrical signal, generated by said receiver in response to the intensity of the reflected radiation, is converted to a pulse rate from the rangefinder encoded as a measure of the distance from the eyeglasses to the object being viewed.

16. The method described in claim 15, wherein said means for adjusting the amount of liquid in said at least one liquid lens to cause it to correct the focus of the eye of the user to the measured distance consists of a pump, hydraulically connected to said at least one lens, and of a pair of electrodes, electrically connected to a resistance meter module, in each of said at least one lens; wherein said resistance meter module develops a signal in the form of a pulse rate in response to the electrical signal received from said electrodes, wherein this pulse rate is compared with the pulse rate produced by said rangefinder, and wherein the difference in pulse rates is converted to an electrical signal used to drive said pump to adjust the content of liquid in said at least one lens, as needed to bring the pulse rates from the rangefinder and the resistance meter to equality.

* * * * *